US008166298B2

(12) United States Patent
Kim et al.

(10) Patent No.: US 8,166,298 B2
(45) Date of Patent: Apr. 24, 2012

(54) DOWNLOADABLE CONDITIONAL ACCESS SYSTEM AND METHOD OF SESSION CONTROL FOR SECURED 2-WAY COMMUNICATION BETWEEN AUTHENTICATION SERVER AND HOST DEVICE IN DOWNLOADABLE CONDITIONAL ACCESS SYSTEM

(75) Inventors: Soon Choul Kim, Daejeon (KR); Young Ho Jeong, Daejeon (KR); Heejeong Kim, Daejeon (KR); Eun Jung Kwon, Daejeon (KR); O Hyung Kwon, Daejeon (KR); Soo In Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 414 days.

(21) Appl. No.: 12/553,942

(22) Filed: Sep. 3, 2009

(65) Prior Publication Data

US 2010/0131761 A1 May 27, 2010

(30) Foreign Application Priority Data

Nov. 21, 2008 (KR) .................. 10-2008-0116381

(51) Int. Cl.
*H04L 29/06* (2006.01)

(52) U.S. Cl. ......... 713/169; 173/150; 173/168; 709/227

(58) Field of Classification Search ........... 713/168–169
See application file for complete search history.

(56) References Cited

U.S. PATENT DOCUMENTS

| 6,385,317 | B1 * | 5/2002 | Rix et al. ..................... 380/258 |
| 6,526,508 | B2 | 2/2003 | Akins, III et al. |
| 7,047,408 | B1 * | 5/2006 | Boyko et al. .................. 713/169 |
| 7,409,061 | B2 * | 8/2008 | Newcombe .................... 380/251 |
| 7,565,537 | B2 * | 7/2009 | Morais et al. ................. 713/169 |
| 2001/0016908 | A1 * | 8/2001 | Blake-Wilson et al. ...... 713/171 |
| 2002/0133707 | A1 * | 9/2002 | Newcombe .................... 713/183 |
| 2002/0166047 | A1 * | 11/2002 | Kawamoto ..................... 713/169 |
| 2003/0110266 | A1 * | 6/2003 | Rollins et al. ................. 709/227 |
| 2005/0210251 | A1 * | 9/2005 | Nyberg et al. ................. 713/169 |
| 2008/0178004 | A1 * | 7/2008 | Wei et al. ...................... 713/171 |

FOREIGN PATENT DOCUMENTS

| KR | 1020050066500 A | 6/2005 |
| KR | 1020060006559 A | 1/2006 |

* cited by examiner

*Primary Examiner* — Ponnoreay Pich
(74) *Attorney, Agent, or Firm* — Blakely, Sokoloff, Taylor & Zafman (57) ABSTRACT

Disclosed is a downloadable conditional access system (DCAS) including a key request unit to transmit a key request message to an authentication server, an authentication request unit to request authentication from the authentication server based on a key response message received from the authentication server in response to the key request message, and a session establishment unit to establish a session with the authentication server, based on an authentication response message received in response to the authentication request.

25 Claims, 7 Drawing Sheets

| | INFORMATION | TYPE | BYTES | DEFINITION |
|---|---|---|---|---|
| 601 | SM ID | Octets | 40 | SECURITY CHIP IDENTIFIER INCLUDED IN TERMINAL |
| 602 | Session ID | Integer | 4 | IDENTIFIER BEING RANDOM VALUE GENERATED BY TERMINAL AND TRANSMITTED TO AUTHENTICATION SERVER, AND DISCRIMINATING SESSION |
| 603 | Message Nonce | Octets | 8 | IDENTIFICATION VALUE INCLUDED IN A MESSAGE HEADER |
| 604 | KeyPairingID | Octets | 16 | UNIQUE VALUE THAT IS COMBINATION OF SECURITY CHIP IDENTIFIER INCLUDED IN TERMINAL AND IDENTIFIER OF DESCRAMBLING CHIP |
| 605 | Network Address | IP address | 4 | TERMINAL IP ADDRESS |
| 606 | Session Status | Integer | 4 | CURRENT SESSION STATE VALUE<br>0: Unknown<br>1: Closed,<br>2: Keying,<br>3: Authenticating,<br>4: Established,<br>5: Downloading,<br>6: LogWaiting |
| 607 | Session Status Time | Integer | 4 | INITIAL TIME OF CURRENT SESSION STATE |
| 608 | Download Result | Integer | 4 | SM CLIENT DOWNLOAD RESULT |
| 609 | Session Start Time | Integer | 4 | SESSION START TIME |
| 610 | Session End Time | Integer | 4 | SESSION END TIME |
| 611 | Caused Error Code | Integer | 4 | SESSION CLOSE REASON CODE |

FIG. 7

DOWNLOADABLE CONDITIONAL ACCESS SYSTEM AND METHOD OF SESSION CONTROL FOR SECURED 2-WAY COMMUNICATION BETWEEN AUTHENTICATION SERVER AND HOST DEVICE IN DOWNLOADABLE CONDITIONAL ACCESS SYSTEM

CROSS-REFERENCE TO RELATED APPLICATION

This application claims the benefit of Korean Patent Application No. 10-2008-0116381, filed on Nov. 21, 2008, in the Korean Intellectual Property Office, the disclosure of which is incorporated herein by reference.

BACKGROUND

1. Field

Example embodiments relate to session control in a downloadable conditional access system (DCAS).

2. Description of the Related Art

Recently, a cable network provider that provides a cable broadcasting channel service has been conducting researches to flexibly manage a conditional access system (CAS) and to effectively reduce time and cost expended for terminal distribution, terminal maintenance, customer support, and the like. Accordingly, much attention is paid to a downloadable CAS (DCAS).

The DCAS provides a method of mutual authentication using an online service and software-based secure SM client download and provides the above service by replacing a procedure performed in a conventional CAS. Therefore, the DCAS is required to overcome a weakness in security due to the mutual authentication online, a weakness in security caused by using a software transmission method instead of a conditional access smart card that is conventionally transferred offline, and the like, to maximize efficiency.

SUMMARY

Example embodiments may provide a method of mutually exchanging a required message between a terminal and an authentication server for a downloadable conditional access (DCA), thereby performing mutual authentication and secured communication.

Example embodiments may also provide a session control method that is efficient in generating a secured channel and maintaining and managing the generated secured channel.

According to example embodiments, there may be provided a downloadable conditional access system, the system including a key request unit to transmit a key request message to an authentication server, an authentication request unit to request authentication from the authentication server based on a key response message received from the authentication server in response to the key request message, and a session establishment unit to establish a session with the authentication server, based on an authentication response message received in response to the authentication request.

According to other example embodiments, there may be provided a downloadable conditional access system, the system including a key response unit to transmit a key response message to a terminal in response to a key request message received from the terminal, an authentication response unit to transmit an authentication response message in response to an authentication request received corresponding to the key response message, and a session establishment unit to establish a session with a terminal when receiving a positive state message with respect to establishment of the session from the terminal in response to the authentication response message.

According to example embodiments, there may be provided a method of controlling a session for secured two-way communication between an authentication server and a host device in a downloadable conditional access system, the method including transmitting a key request message to the authentication server, receiving a key response message from the authentication service in response to the transmitted key request message, requesting authentication from the authentication server based on the received key response message, receiving an authentication response message from the authentication server in response to the authentication request, and establishing a session with the authentication server based on the received authentication response message.

According to other example embodiments, there may be provided a method of controlling a session for secured two-way communication between an authentication server and a host device in a downloadable conditional access system, the method including transmitting a key response message to a terminal in response to a key request message received from the terminal, receiving an authentication request from the terminal in response to the key response message, transmitting an authentication response message to the terminal in response to the received authentication request, and establishing a session with the terminal when a positive state message with respect to establishment of the session is received from the terminal in response to the authentication response message.

Additional aspects and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
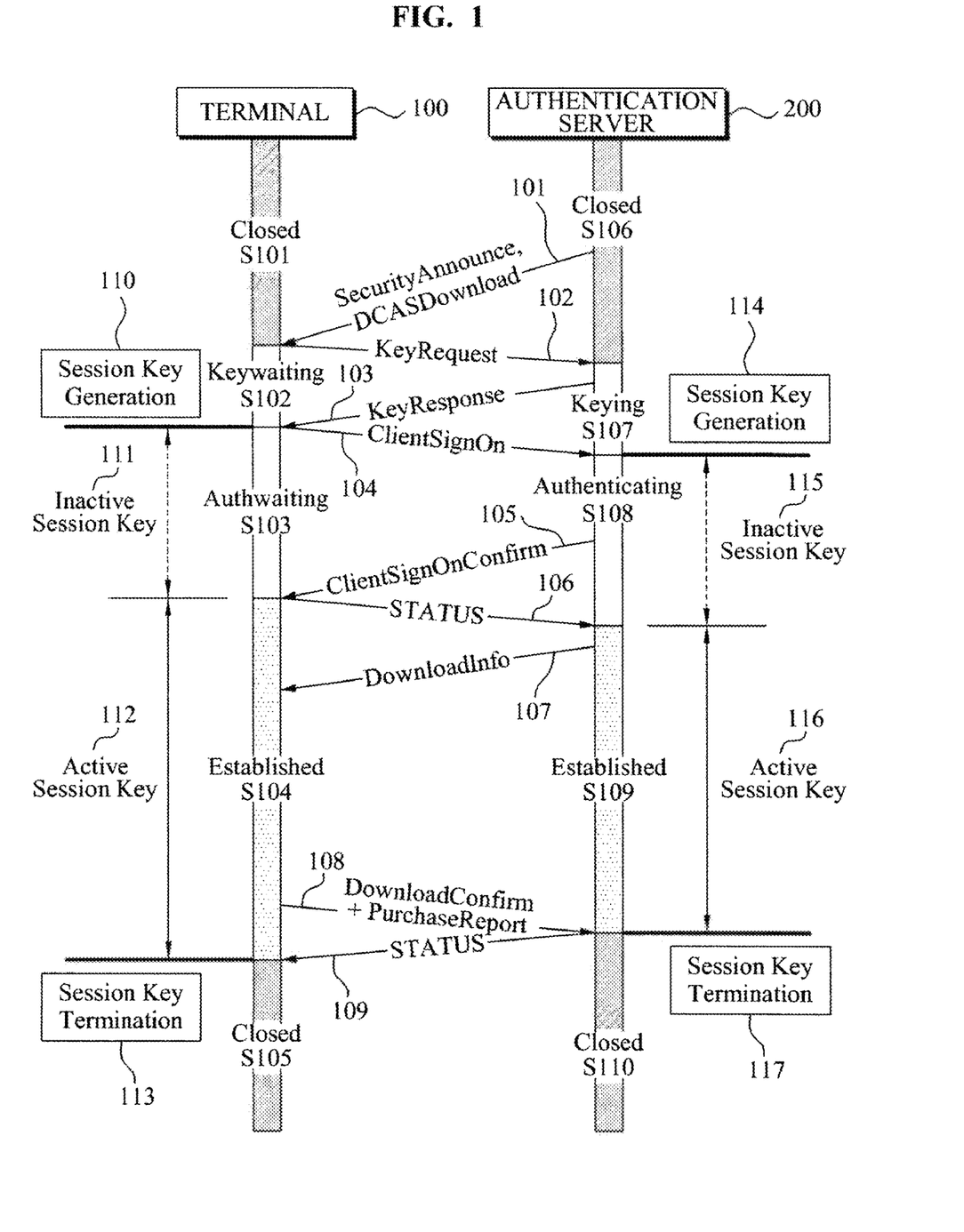
FIG. 1 is a diagram defining a process state according to a downloadable conditional access system (DCAS) protocol message between a terminal and an authentication server, and illustrating main operations in each process state, in a DCAS according to example embodiments.

FIG. 1 is a diagram defining a process state according to a downloadable conditional access system (DCAS) protocol message between a terminal and an authentication server and illustrating main operations in each process state, in a DCAS according to example embodiments.

Referring to FIG. 1, the DCAS according to example embodiments includes a terminal 100 and an authentication server 200.

In example embodiments, a state that a session between the terminal 100 and the authentication 200 is not established or a state that information is not exchanged between the terminal 100 and the authentication server 200 since the session is closed is referred to as a "Closed" state S101, S105, S106, and S110.

The authentication server 200 in the "Closed" state S106 transmits, to the terminal 100 in the "Closed" state S101, a message including downloadable software version information, to instruct the terminal 100 to perform a session connection request or to instruct the terminal 100 to determine whether to open the session connection in operation 101.

Subsequently, the terminal 100 requests key information required for generating a session key from the authentication server in operation 202, and waits, in a "keywaiting" state S103, until a key information response is received in operation 103.

The authentication server 200 transmits the key information response in response to a key information request 102 of the terminal 100, and waits, in a "Keying" state S107, until an authentication request combined with the key information response is received from the terminal 100 in operation 104.

The terminal 100 generates the session key using key information that the terminal 100 generates and key information obtained from the key information response 103 before transmitting the authentication request to the authentication server 200. Subsequently, the terminal 100 transmits the authentication request to the authentication server 200 and simultaneously waits, in an "AuthWaiting" state S103, for a result with respect to the authentication request.

The authentication server 200 receives the authentication request from the terminal 100, and exists in an "Authenticating" state S108 while transmitting the result with respect to the received authentication request. In this instance, the authentication server 200 generates a session key according to a key generation algorithm similar to the algorithm that the terminal 100 uses, based on key information that the authentication server 200 contains and key information included in the authentication request of the terminal 100 in operation 114. The session keys respectively generated and stored by the terminal 100 and the authentication server 200 may remain as inactive secured keys 111 and 115 until the terminal 100 and the authentication server 200 are in "Established" state S104 and S109.

The terminal 100 receives the result with respect to the authentication request from the authentication server 200 in operation 105, and transmits a confirmation that the terminal shares a same session key with the authentication server 200. The terminal 100 and the authentication server 200 exist in "Established" state S104 and S109 where a secured session connection is established, and the secured keys 111 and 115 which have been inactive are activated as reliable active session keys 112 and 116. Subsequently, the terminal 100 and the authentication server 200 may exchange secured information using the session key in operation 107 and 108.

When the authentication server 200 wishes to close a session based on determining that there is no need to transmit a request to the terminal 100 or to wait for a response for the request, the authentication server 200 transmits a state message instructing the terminal to close the session to the terminal 100 in operation 109, and all the session has been performed up to date is closed S110. In this instance, the authentication server 200 performs backup or deleting from a memory, all session key information relating to the session and information of the terminal 100 in operation 117.

When the terminal 100 receives the state message instructing the terminal to close the session from the authentication server 200 in operation 109, the terminal 100 also closes the currently opened session S105 and simultaneously deletes information relating to the session such as the session key and the like, from a memory in operation 113.

Figure 2:
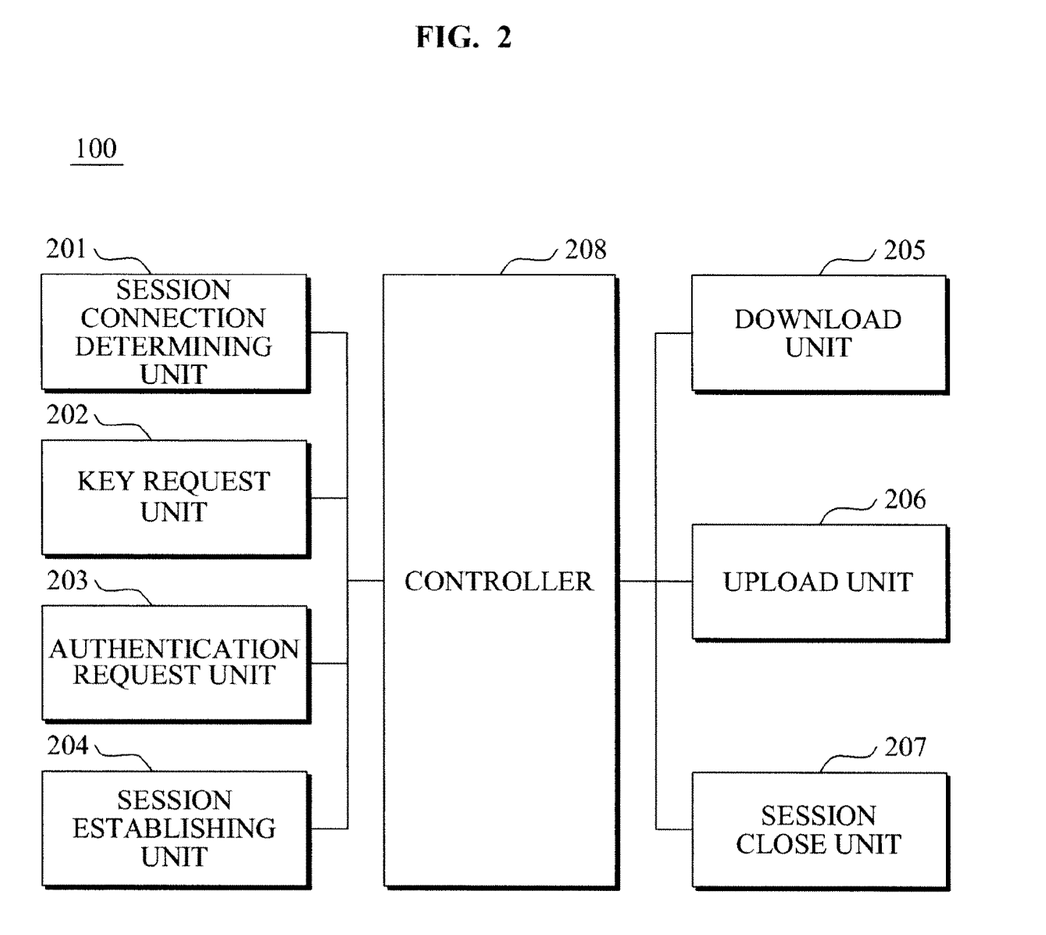
FIG. 2 is a block diagram illustrating the terminal of FIG. 1 in detail.

FIG. 2 is a block diagram illustrating the terminal 100 of FIG. 1 in detail.

Referring to FIG. 2, the terminal 100 includes a session connection determining unit 201, a key request unit 202, an authentication request unit 203, a session establishment unit 204, a download unit 205, an upload unit 206, a session close unit 207, and a controller 208.

The session connection determining unit 201 determines whether a session connection with an authentication server is required based on a message received from the authentication server. Here, the message may include first software version information, information relating to compulsory software installation, and the like.

As an example, the session connection determining unit 201 determines that the session connection with the authentication is required when the first software version information included in the message is different from second software version information stored in advance in the terminal, and determines that the session connection with the authentication is not required when the first software version information is identical to the second software version information.

Also, the session connection determining unit 201 determines that the session connection with the authentication is required when the information relating to compulsory software installation is included in the message, and when the information relating to compulsory software installation is not included in the message, determines whether the session connection with the authentication server is required by comparing the software version information.

The key request unit 202 transmits a key request message to the authentication server when the session connection is required.

The authentication request unit 203 requests authentication from the authentication server based on a key response message that is received from the authentication server in response to the transmitted key request message. That is, the authentication request unit 203 generates a session key using key information of the terminal 100 and key information of the authentication server included in the key response message, and requests authentication from the authentication server using the generated session key.

The session establishment unit 204 establishes the session with the authentication sever based on an authentication response message received in response to the authentication request. That is, the session establishment unit 204 transmits, to the authentication server, a positive state message with respect to establishment of the session to establish the session with the authentication server when the session key generated by the terminal 100 is identical to a session key included in the authentication response message, the session key being generated by the authentication server.

The download unit 205 performs download secured information from the authentication server when the established session with the authentication server is opened. That is, the download unit 205 may perform download the secured information, such as downloadable software information and the like, from the authentication server via a secured channel, when the established session with the authentication server is opened.

When the download is completed, the upload unit 206 transmits confirmation information with respect to the download and payment information according to the download, to the authentication server.

When a state message instructing the terminal 100 to close the session is received from the authentication server, the session close unit 207 closes the established session and deletes, from a memory of the terminal, session keys respectively generated by the authentication server and the terminal 100, information relating to the each of the generated session keys, and the like.

The controller 208 generally controls operations of the session connection determining unit 201, the key request unit 202, the authentication request unit 203, the session establishment unit 204, the download unit 205, the upload unit 206, and the session close unit 207.

Figure 3:
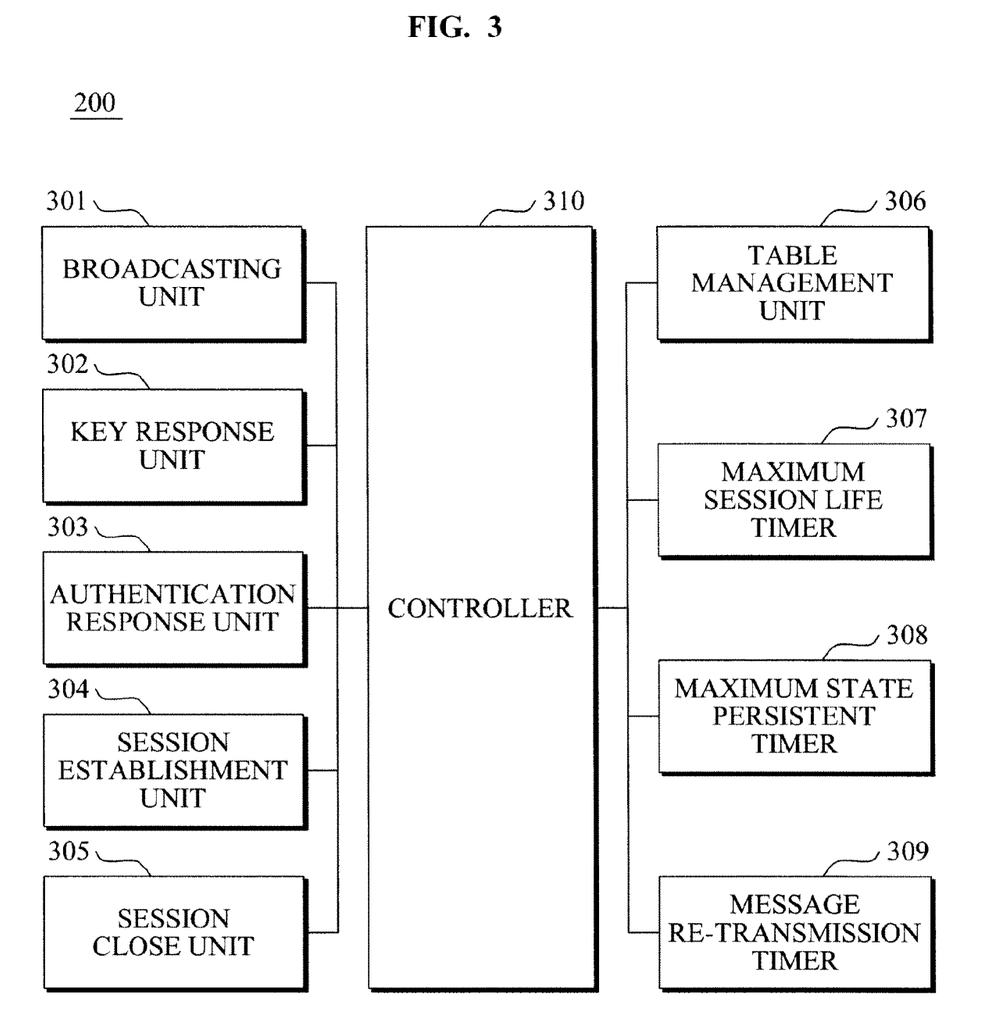
FIG. 3 is a block diagram illustrating the authentication server of FIG. 1 in detail.

FIG. 3 is a block diagram illustrating the authentication server 200 of FIG. 1 in detail.

Referring to FIG. 3, the authentication server 200 includes a message broadcasting unit 301, a key response unit 302, an authentication response unit 303, a session establishment unit 304, a session close unit 305, a table management unit 306, a maximum session life timer 307, a maximum state persistent timer 308, a message re-transmission timer 309, and a controller 310.

The message broadcasting unit 301 broadcasts a message including software version information to enable a terminal to determine whether session connection is required. Here, the message may include a security announce message or a DCASdownload message.

The key response unit 302 transmits a key response message to the terminal in response to a key request message received from the terminal. Here, the key response message may include key information of the authentication server 200.

The authentication response unit 303 transmits an authentication response message to the terminal in response to an authentication request received in response to the key response message. That is, the authentication response unit 303 may generate a session key based on key information of the authentication server 200 and key information of the terminal included in the authentication request, and may transmit the authentication response message including the generated session key.

The session establishment unit 304 establishes a session with the terminal when receiving a positive state message with respect to establishment of the session from the terminal in response to the authentication response message.

The session close unit 305 transmits, to the terminal, a state message instructing the terminal to close the session, and performs backup or deletion from a memory, information relating to the session such as session keys respectively generated by the terminal and the authentication server 200, information relating to each session key, information of the terminal, and the like.

The table management unit 306 stores the session with the terminal in a table and manages the stored session using an identifier of a security chip contained in the terminal and a session identifier of the terminal, when the established session is opened. The table will be described with reference to FIG. 6 in detail.

The maximum session life timer 307 manages time where the established session is maintained. The maximum state persistent timer 308 manages a persistent time that is from a first point of time to a second point of time, the first point of time being a time that a state message relating to a first state arrives from the terminal and the second point of time being a time that a state of the terminal is transited to a second state different from the first state. The message re-transmission timer 309 transmits a message identical to a message transmitted prior to a third point of time, when a message for transition to another state is not received at the third point of time in the persistent time. The maximum session life timer 307, the maximum state persistent timer 308, and the message re-transmission timer 309 will be described with reference to FIG. 7 in detail.

The controller 310 generally controls operations of the message broadcasting unit 301, a key response unit 302, an authentication response unit 303, the session establishment unit 304, the session close unit 305, the table management unit 306, the maximum session life timer 307, the maximum state persistent timer 308, and the message re-transmission timer 309, and the like.

Figure 4:
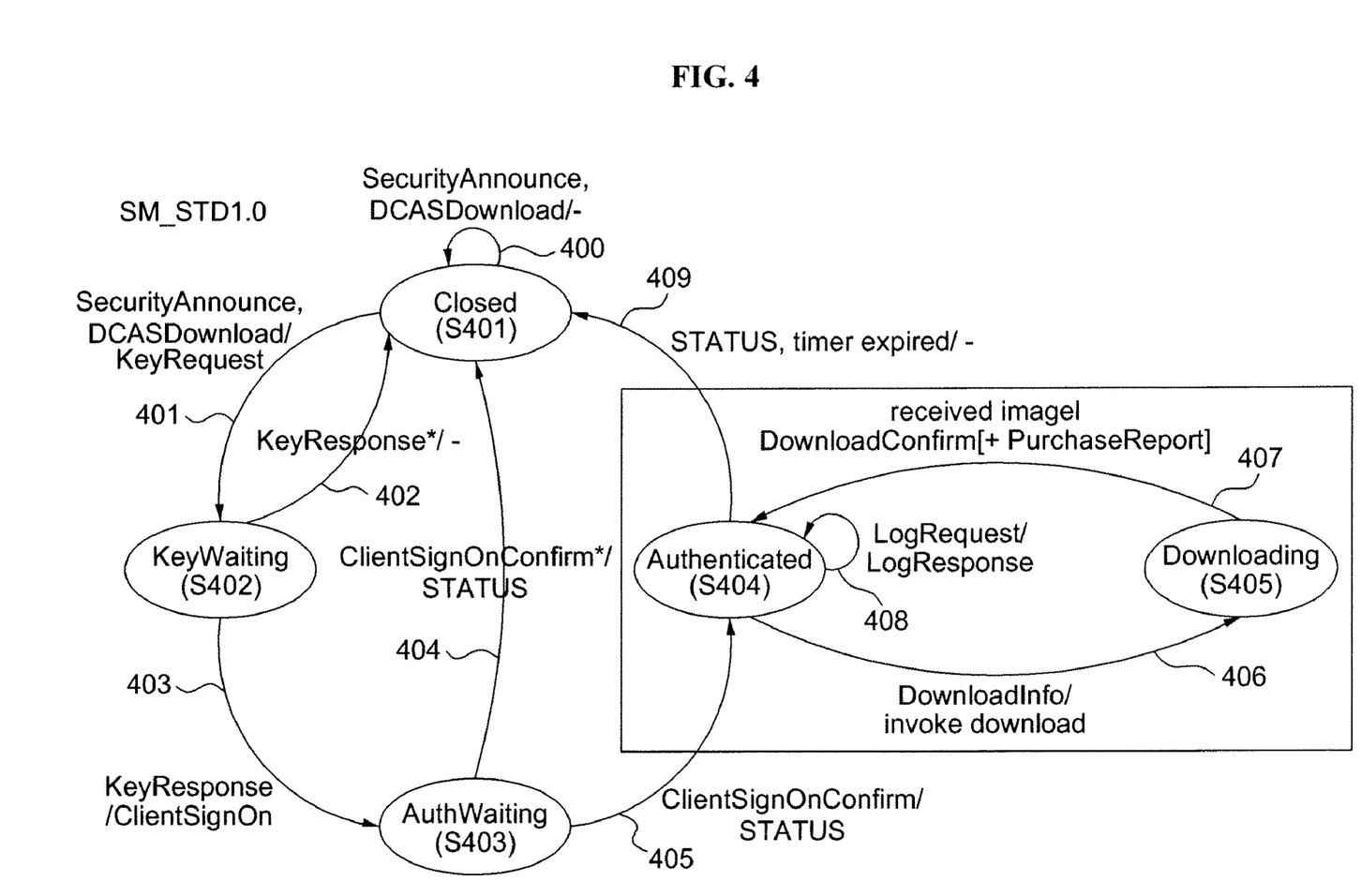
FIG. 4 illustrates a state transition diagram according to a message process when a terminal performs session control using an authentication server and a DCAS protocol message, according to example embodiments.

FIG. 4 illustrates a state transition diagram according to a message process when a terminal performs session control using an authentication server and a DCAS protocol message, according to example embodiments.

The terminal has five state types as below.

Closed: a state of waiting for a DCAS message to be received from a server.

KeyWaiting: a state of waiting for a response after requesting key information required for generating a session key.

AuthWaiting: a state of waiting for a response after requesting authentication after generating a session key, the generated session key being inactive until the response is received from a server.

Established: a state of mutually sharing a session key after authentication is completed, the session key being active when the state is in "Established" state, and then waiting for an instruction for a next operation from a server.

Downloading: a state of downloading an SM client from a download server.

The terminal receives a message broadcasted from the authentication server while the terminal is in "Closed" state S401 that is an initial state or has no connection with the authentication server, and maintains "Closed" state S401 when an operation corresponding to the received message is not required.

In this instance, the terminal receives the message broadcasted from the authentication server, and when determining that a session with the authentication server is required based on the received message, transmits a key request message to the authentication server in operation 401 and transits the state of the terminal to "KeyWaiting" state S402.

When a response result with respect to the key request is positive, the terminal in "KeyWaiting" state S402 transits the state of the terminal to "AuthWaiting" state S403 in operation 403, and when the response result with respect to the key request is negative, the terminal transits the state of the terminal to "Closed" state S401. That is, when the terminal receives a key response message including key information from the authentication server within a certain time, the state transits to "AuthWaiting" state S403, and when the terminal receives a key response message that does not include key information from the authentication server within the certain time or fails to receive the key response message, the state transits to "Closed" state S401.

When a result with respect to the authentication request is positive, the terminal in "AuthWaiting" state S403 transits the state of the terminal to "Authenticated" state S404 where a session is established, and when the result with respect to the authentication request is negative, the terminal transits the state of the terminal to "Closed" state S401, namely an initial state, in operation 404.

The terminal in "Authenticated" state S404 receives download information from the authentication server in operation 406, and transits the state to "Downloading" state S405 while the terminal downloads the received download information.

Subsequently, the terminal receives an inner signal of the terminal reporting that the download is completed, successively or simultaneously transmits download confirmation information and payment information to the authentication server, and transits the state to "Authenticated" state S404.

However, while the terminal is in "Authenticated" state S404, the terminal is able to replay a log information response whenever a log information request is received from the authentication server in operation 408. Subsequently, when the terminal receives a message instructing to close the session from the authentication server or receives a session expiration timer signal, the terminal closes the session and transit the state to "Closed" state S401.

Figure 5:
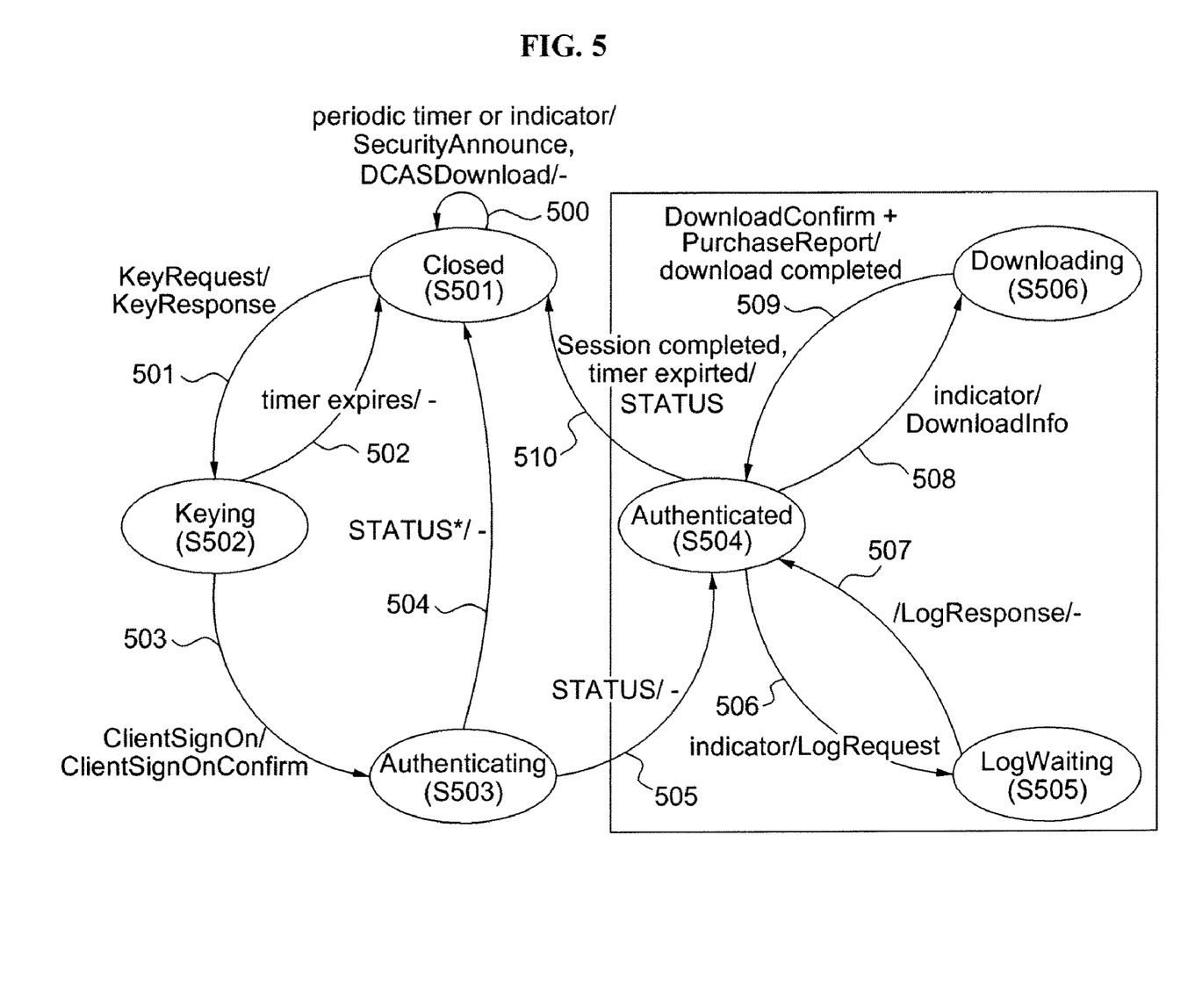
FIG. 5 illustrates a state transition diagram according to a message process when an authentication sever performs session control using a terminal and a DCAS protocol message.

FIG. 5 illustrates a state transition diagram according to a message process when an authentication server performs session control using a terminal and a DCAS protocol message.

The authentication server has six state types as below.

Closed: a state of waiting for receiving a key request message after periodically broadcasting a DCAS broadcast message.

Keying: a state where key information required for generating a session key has been transmitted to a terminal via a trusted authority (TA). When a next message is not received within a certain time, the state is returned back to "Closed" state.

Authenticating: a state where a session key has been generated and an authentication result has been transmitted, the generated session key being inactive until a response with respect to establishment of the session key is received from a terminal.

Established: a state of mutually sharing a session key. The session key is active from the "Established" state, and a message is secured by the session key and an instruction for a next operation is transmitted to the terminal. When there is no internal/external request for information, an authentication server instructs the terminal to close the session and closing its own session.

Downloading: a state of waiting for receiving a result with respect to terminal's downloading of an SM client and establishing of an SM client.

LogWaiting: a state where log information of a terminal.

The authentication server transmits information to the terminal periodically or as required, to support software download, in "Closed" state S501 that is an initial state or has no connection with a corresponding terminal in operation 500.

The authentication server in "Closed" state S501 transmits a key request response with respect to a key request message from the terminal and transits the state to "Keying" state S502. After transmitting the key request response, when a waiting time for receiving an authentication request is expired, the authentication server in "Keying" state S502 transits the state to "Closed" state S501 again. Conversely, when the authentication server receives an authentication request before expiration of the waiting time for receiving the authentication request, the authentication server transmits an authentication request response in operation 503 and waits, in "Authenticating" state S503", until receiving a state message with respect to establishment of the session from the terminal.

When the authentication server receives a negative state message with respect to establishment of the session from the terminal for any reason, transits the state to "Closed" state S501 in operation 504, and when the authentication server receives a positive state message with respect to establishment of the session, transits the state to "Authenticated" state S504 where the session is established, in operation 505.

However, the authentication server in "Authenticated" state S504 may request log information from an authenticated terminal in operation 506 or may pass a state S505 where receives a response with respect to the log information request in operation 507.

Also, the authentication server transmits download information to the authenticated terminal in operation 508, and waits, in "Downloading" state S506, until a download result is received from the terminal in operation 509. When the authentication server receives download result such as download confirmation information, payment information, and the like, returns the state to "Authenticated" state S504 in operation 509.

Subsequently, when it is a session expiration time or there is no request message with respect to the terminal, the authentication server transmits a state message instructing the terminal to close the session and transits the state to "Closed" state S501 that is an initial state after closing the session.

Figure 6:
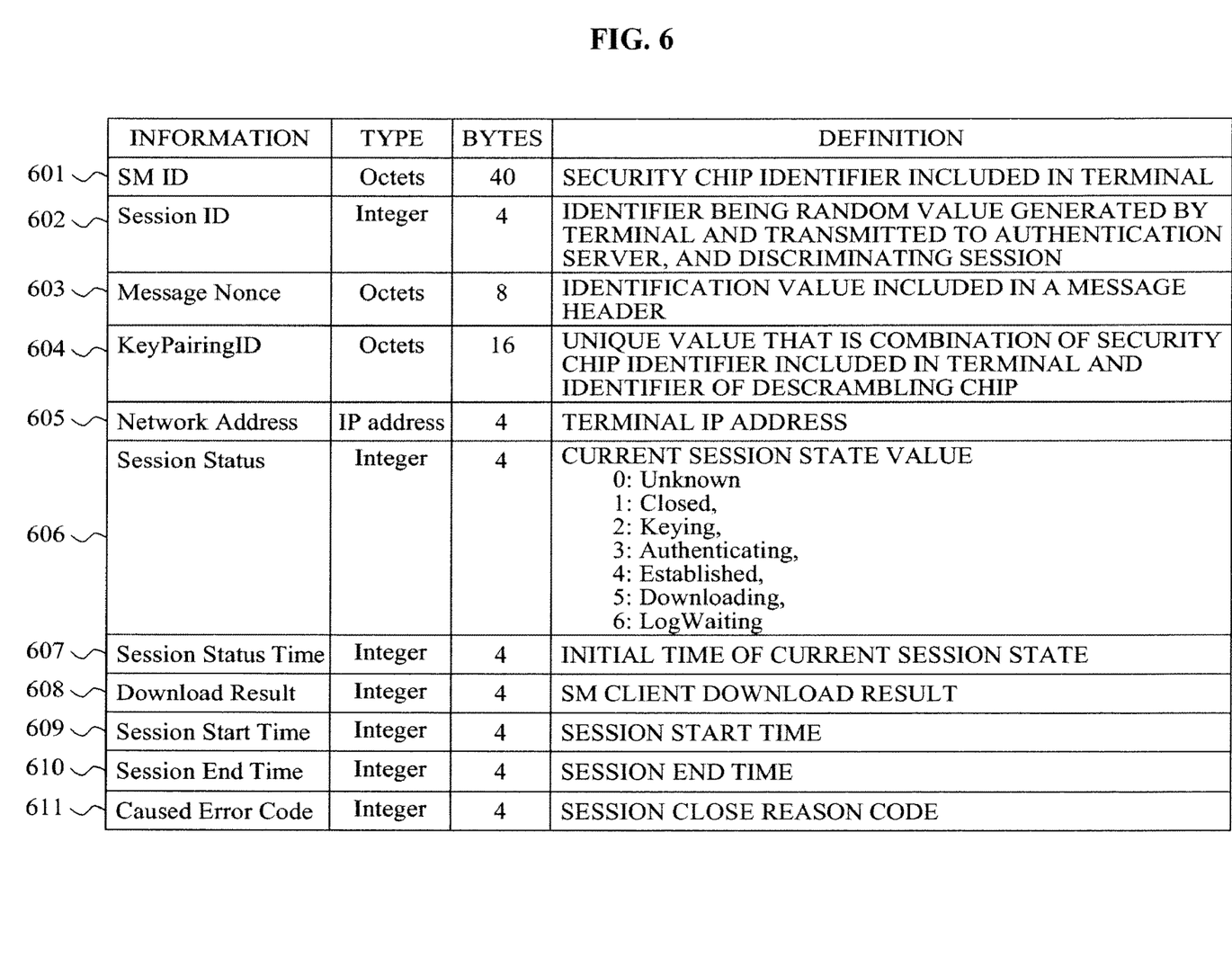
FIG. 6 illustrates table information required for session control from establishment of a session to close of the session to generate and maintain sessions with a plurality of terminals in an authentication server.

FIG. 6 illustrates table information required for session control from establishment of a session to close of the session to generate and maintain sessions with a plurality of terminals in an authentication server.

Referring to FIG. 6, an SM ID 601 is a security chip identifier contained in a terminal. The security chip is a main body that handles a DCAS protocol. The session ID 602 is an identifier used to discriminate the current session from previous sessions.

When messages have the same session ID 602, the terminal and the authentication server determine the messages as messages classified into a same section and process the messages according to an identical procedure. The SM ID 601 and the Session ID 602 are used as a master key when the authentication server stores sessions with a plurality of terminals in a table in real time and manages the stored sessions.

A message nonce 603 is a message identification value used for detecting redundancy with respect to the same message in the same session. A keyPairingID 604 is a unique value that is combination of the SM ID 601 included in the terminal and an identifier of a descrambling chip. A network address 605 is a network address of the terminal, and a value of the network address may be a changeable value in the same section.

A session status 606 is a current value of a state of a message process, with respect to terminals that currently perform the message process. A session status time 607 is an initial time of a current session state of the terminal and is a time of transition to the current state from a previous state. A download result 608 is a value reporting completion of download and an applying result. A session start time 609 is a time value of when the terminal transmits a key request message having a new session ID 602 to the authentication server. A session end time 610 is a value defining a close reason code of when the session is normally or abnormally completed.

Figure 7:
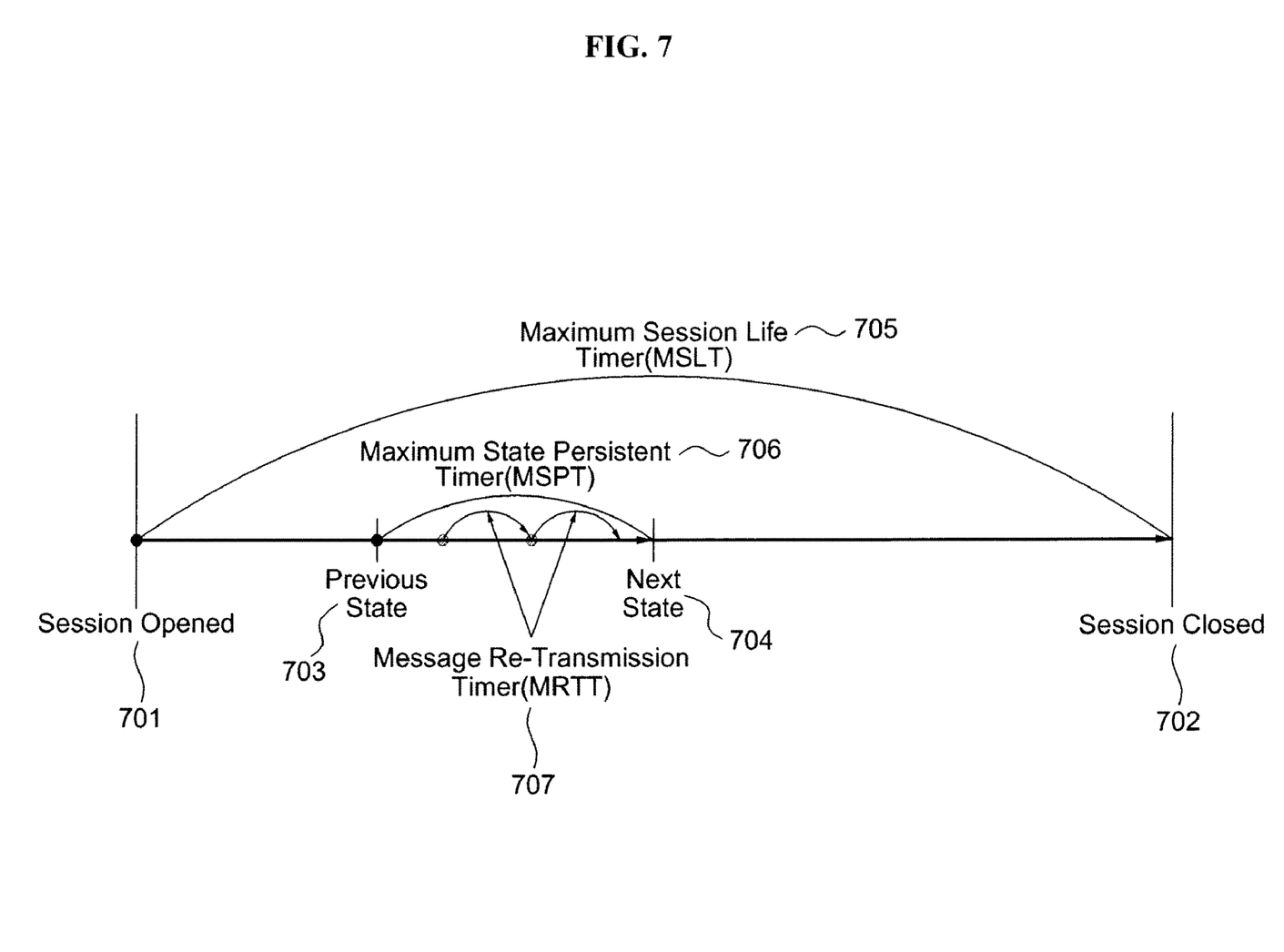
FIG. 7 illustrates three timers of FIG. 3.

FIG. 7 illustrates the three timers 307, 308, and 309 of FIG. 3. That is, FIG. 7 illustrates that the authentication server has three timers in each section to prevent decreasing efficiency of a system due to limited system resources and to reliably perform message transmission without message loss that may occur in a line or in a terminal, when the authentication server performs session control with respect to a plurality of terminals.

Referring to FIG. 7, the authentication server registers timers in a system in a state corresponding to each condition, and when the authentication server receives a timer expiration signal, performs a forced close or transits a state into a next state according to the state transition of FIG. 5.

To perform the above, the authentication server includes the three timers as below.

The authentication server opens a session when a request message having a new session ID is received, and closes the session when all procedures are finished. In this instance, the authentication server manages a time where the session is maintained as a maximum session lift timer (MSLT) in operation 705.

In this instance, state transition occurs while "session opened" state 701 and "session closed" state 702 are maintained. The authentication server manages a persistent time that is from a point of time that a state message arrives to a time that a next state that the authentication server is transited to the next state as a maximum state persistent timer (MSPT) 706., Also, when a message for transition to another state is not received within a time in the persistent time that is managed by the MSPT 706, the authentication server transmits a message identical to a message transmitted just prior to the transmission. For a timer for retransmission of the identical message, a message re-transmission timer (MRTT) 707 is used.

The MSLT 705 is appropriately set up by a system administrator. The authentication server performs a forced close with respect to a current session and reporting that the session is forced closed to the terminal, and deletes all messages including a closed session ID when the MSLT 705 is expired. This is to protect information relating to a key used for maintaining a session and to prevent waste of resource of the authentication server and to stably maintain the resource of the authentication server when the authentication infinitely occupies channels from a plurality of terminals.

The MSPT 706 closes the session or transits the state into a next state when an event for transiting to the next state does not occur, while a session management entity remains in each respective state.

When the session management entity does not receive a message for a next operation after transmitting a message, the MRTT 707 performs retransmission of an identical message.

The authentication server may set up a time managed by the MRTT 707 within a time managed by the MSPT 706 and may determine a maximum re-transmission number in the set time. The authentication server gives a priority to the MSLT 705, the MSPT 706, and the MRTT 707, sequentially, and when a high ranked timer is expired before a low ranked timer is expired, the authentication server closes all currently ongoing low ranked timers.

The method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

According to example embodiments, there may be provided a method of mutually exchanging a required message between a terminal and an authentication server for a downloadable conditional access (DCA), thereby performing mutual authentication and secured communication.

According to example embodiments, there may be provided a session control method that is efficient in generating a secured channel and maintaining and managing the generated secured channel.

Although a few example embodiments have been shown and described, it would be appreciated by those skilled in the art that changes may be made in these example embodiments without departing from the principles and spirit of the invention, the scope of which is defined in the claims and their equivalents.

What is claimed is:

1. A downloadable conditional access system, the system comprising:
a key request unit to transmit a key request message to an authentication server;
an authentication request unit to request authentication from the authentication server based on a key response message received from the authentication server in response to the key request message; and
a session establishment unit to establish a session with the authentication server, based on an authentication response message received in response to the authentication request.

2. The system of claim 1, wherein:
the authentication request unit generates a session key using key information of a terminal and key information included in the key response message, and requests authentication from the authentication server using the generated session key; and
the session establishment unit transmits to the authentication server a positive state message with respect to establishment of the session to establish the session with the authentication server when the generated session key is identical with a session key included in the authentication response message.

3. The system of claim 1, further comprising:
a session connection determining unit to determine whether a session connection with the authentication server is required based on a message received from the authentication server,
wherein the key request unit transmits the key request message to the authentication server when the session connection is determined to be required.

4. The system of claim 3, wherein the session connection determining unit determines the session connection with the authentication server is required when first software version information included in the message is different from second software version information stored in advance in a terminal, and determines the session connection with the authentication server is not required when the first software version information is identical with the second software version information.

5. The system of claim 3, wherein the session connection determining unit determines the session connection with the authentication server is required when the message includes information relating to compulsory software installation.

6. The system of claim 1, further comprising:
a download unit to download secured information from the authentication server when the established session with the authentication server is opened; and
an upload unit to transmit confirmation information with respect to the download and payment information according to the download, when the download is completed.

7. The system of claim 1, further comprising:
a session closing unit to close the established session, and to delete, from a memory of the terminal, session keys respectively generated by the authentication server and the terminal, and information relating to the each of the generated session keys, when a state message instructing to close the established session is received.

8. A downloadable conditional access system, the system comprising:
a key response unit to transmit a key response message to a terminal in response to a key request message received from the terminal;
an authentication response unit to transmit an authentication response message in response to an authentication request received corresponding to the key response message; and
a session establishment unit to establish a session with a terminal when receiving a positive state message with respect to establishment of the session from the terminal in response to the authentication response message.

9. The system of claim 8, wherein the authentication response unit generates a session key based on key information of an authentication server and key information of the terminal included in the authentication request, and transmits an authentication response message including the generated session key.

10. The system of claim 8, further comprising:
a session closing unit to close the established session by transmitting a state message instructing to close the established session to the terminal, and to backup or delete from a memory, session keys respectively generated by the terminal and the authentication server, information relating to each of the generated session keys, and information of the terminal.

11. The system of claim 8, further comprising:
a table managing unit to store the session with the terminal in a table and to manage the stored session using an identifier of a security chip contained in the terminal and a session identifier of the established session to the terminal, when the established session with the terminal is opened.

12. The system of claim 8, further comprising:
a message broadcasting unit to broadcast a message including software version information to enable the terminal to determine whether session connection is required.

13. The system of claim 12, wherein the message comprises a security announcement message or a DCAS download message.

14. The system of claim 8, further comprising:
a maximum session life timer to manage time where the established session is maintained;
a maximum state persistent timer to manage persistent time that is from a first point of time to a second point of time, the first point of time being a time that a state message relating to a first state arrives from the terminal and the second point of time being a time that a state of the terminal is transited to a second state different from the first state; and
a message retransmission timer to transmit a message identical to a message transmitted prior to a third point of time, when a message for transition to another state is not received at the third point of time in the maintenance time.

15. A method of controlling a session for secured two-way communication between an authentication server and a host device in a downloadable conditional access system, the method comprising:
transmitting a key request message to the authentication server;
receiving a key response message from the authentication service in response to the transmitted key request message;
requesting authentication from the authentication server based on the received key response message;
receiving an authentication response message from the authentication server in response to the authentication request; and
establishing a session with the authentication server based on the received authentication response message.

16. The method of claim 15, wherein the requesting of the authentication comprises:
generating a session key using key information of a terminal and key information of the authentication server included in the key response message; and
requesting the authentication from the authentication server using the generated session key.

17. The method of claim 16, wherein the establishing of the session with the authentication server comprises:
establishing the session with the authentication server by transmitting, to the authentication server, a positive state message with respect to establishment of the session, when the generated session key is identical with a session key included in the authentication response message.

18. The method of claim 15, further comprising:
determining whether a session connection with the authentication server is required based on a message received from the authentication server,
wherein the transmitting of the key request message comprises transmitting the key request message to the authentication server when the session connection is determined to be required.

19. The method of claim 18, wherein the determining of whether the session connection with the authentication server is required comprises:
determining the session connection with the authentication server is required when first software version information included in the message is different from second software version information stored in advance in a terminal; and
determining the session connection with the authentication server is not required when the first software version information is identical with the second software version information.

20. The method of claim 15, further comprising:
downloading secured information from the authentication server when the established session with the authentication server is opened; and
transmitting confirmation information with respect to the download and payment information according to the download, when the download is completed.

21. The method of claim 15, further comprising:
closing the established session and deleting session keys respectively generated by the terminal and the authentication server and information relating to each of the generated session keys from a memory of the terminal, when a state message instructing to close the established session is received from the authentication server.

22. A method of controlling a session for secured two-way communication between an authentication server and a host device in a downloadable conditional access system, the method comprising:
transmitting a key response message to a terminal in response to a key request message received from the terminal;
receiving an authentication request from the terminal in response to the key response message;
transmitting an authentication response message to the terminal in response to the received authentication request; and
establishing a session with the terminal when a positive state message with respect to establishment of the session is received from the terminal in response to the authentication response message.

23. The method of claim 22, wherein the transmitting of the authentication response message comprises:
generating a session key based on key information of the authentication server and key information of the terminal included in the authentication request; and
transmitting the authentication response message including the generated session key.

24. The method of claim 22, further comprising:
closing the established session by transmitting a state message instructing to close the established session to the terminal; and
backing up or deleting from a memory, session keys respectively generated by the terminal and the authentication server, information relating to each of the generated session keys, and information of the terminal.

25. The method of claim 22, further comprising:
storing the session with the terminal in a table and managing the stored session using an identifier of a security chip contained in the terminal and a session identifier of the terminal, when the established session with the terminal is opened.

\* \* \* \* \*